United States Patent [19]

Gay et al.

[11] Patent Number: 4,733,763

[45] Date of Patent: Mar. 29, 1988

[54] COUPLABLE/DECOUPLABLE CLUTCH RELEASE BEARING ASSEMBLY

[75] Inventors: Christian Gay, Paris; Philippe Lassiaz, Boulogne, both of France

[73] Assignee: Valeo, Paris, France

[21] Appl. No.: 916,749

[22] Filed: Oct. 8, 1986

[30] Foreign Application Priority Data

Oct. 9, 1985 [FR] France ................... 85 14933

[51] Int. Cl.⁴ .............................. F16D 23/14
[52] U.S. Cl. ...................... 192/98; 192/110 B; 192/DIG. 1
[58] Field of Search ............. 192/98, 70.13, 89 B, 192/110 B, DIG. 1

[56] References Cited

U.S. PATENT DOCUMENTS

| | | | |
|---|---|---|---|
| 4,228,882 | 10/1980 | Huber et al. | 192/98 |
| 4,399,898 | 8/1983 | Olschewski et al. | 192/98 |
| 4,405,041 | 9/1983 | Broadbent | 192/98 |
| 4,502,583 | 3/1985 | Limbacher | 192/98 |
| 4,560,053 | 12/1985 | Lassiaz | 192/98 |
| 4,588,061 | 5/1986 | Mallet | 192/98 |
| 4,613,027 | 9/1986 | Lassiaz et al. | 192/89 B |
| 4,632,237 | 12/1986 | Maycock et al. | 192/98 |
| 4,646,897 | 3/1987 | Winters | 192/98 |
| 4,646,898 | 3/1987 | Muller | 192/98 |
| 4,648,499 | 3/1987 | Despres et al. | 192/98 |

FOREIGN PATENT DOCUMENTS

| | | |
|---|---|---|
| 110602 | 6/1984 | European Pat. Off. |
| 2304826 | 10/1976 | France . |
| 2545172 | 11/1984 | France . |
| 2062799 | 5/1981 | United Kingdom . |
| 2098697 | 11/1982 | United Kingdom ............ 192/70.13 |

Primary Examiner—Rodney H. Bonck
Assistant Examiner—Richard M. Lorence
Attorney, Agent, or Firm—Charles E. Brown; Charles A. Brown

[57] ABSTRACT

A clutch release bearing assembly comprises a coupling part which is adapted to couple a clutch release bearing to a clutch release device of a clutch. The coupling part is attached to the clutch release device. Part of the clutch release bearing forms a drive part. There is an annular retaining groove on one of the coupling and drive parts. A fastening device operative in traction between the coupling part and the drive part is adapted to couple these parts together in the axial direction from the clutch release device to the clutch release bearing. The fastening device comprises an annular coupling member which is elastically deformable in the radial direction and at least partially engaged in the annular retaining groove. It further comprises a substantially transverse drive bearing surface on the other of the aforementioned coupling and drive parts on which this coupling member bears axially in the axial direction in question. There is a groove in the same part as this drive bearing surface. An annular decoupling member is adapted to decouple the clutch release bearing from the clutch release device, which is axially movable in the groove of one flank of which the drive bearing surface forms part. The annular decoupling member also comprises an annular groove facing the annular retaining groove for coupling it selectively to the coupling member at least in the axial direction from the clutch release device to the clutch release bearing.

27 Claims, 19 Drawing Figures

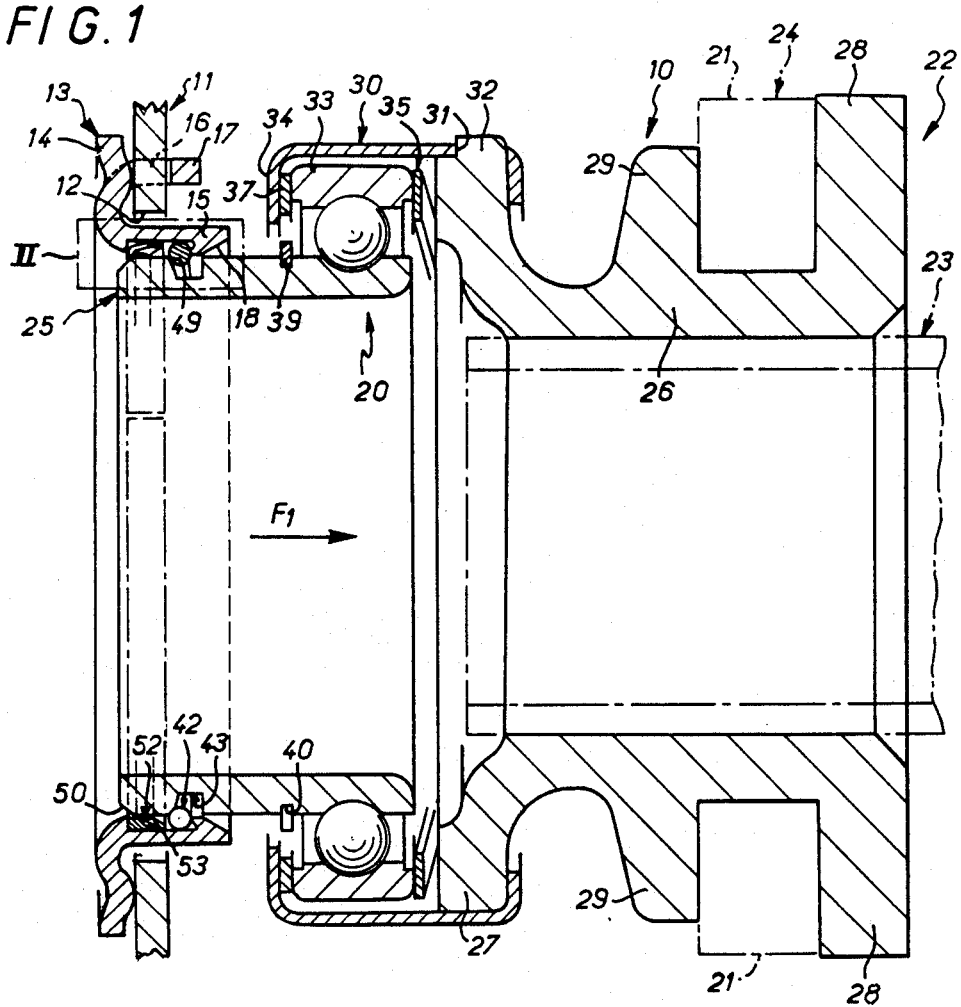
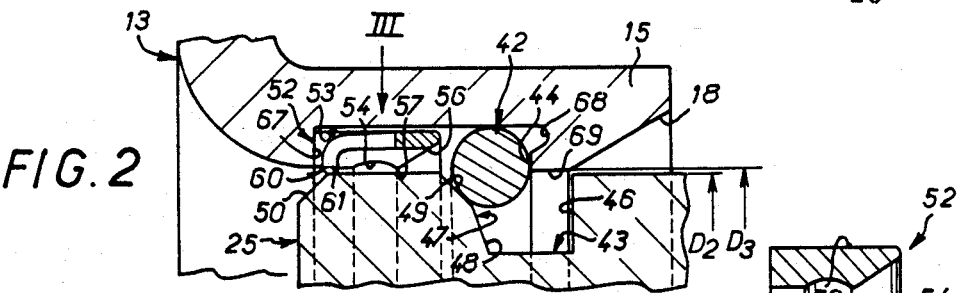
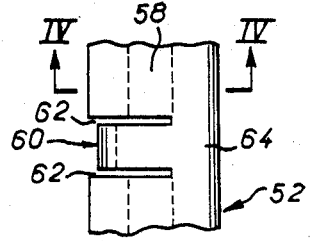
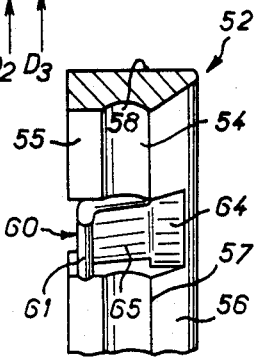
FIG.1
FIG.2
FIG.3
FIG.4

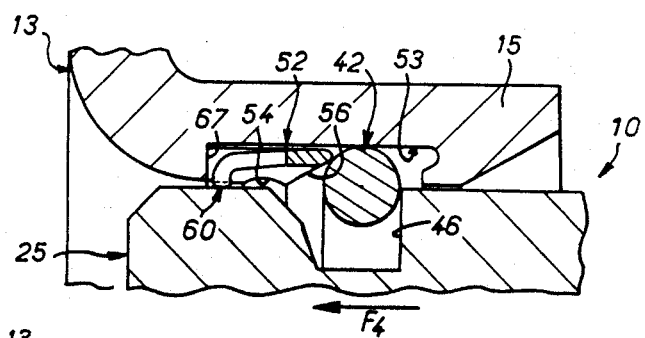
FIG.6A
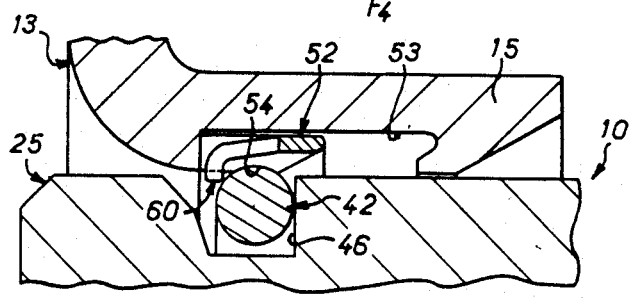
FIG.6B
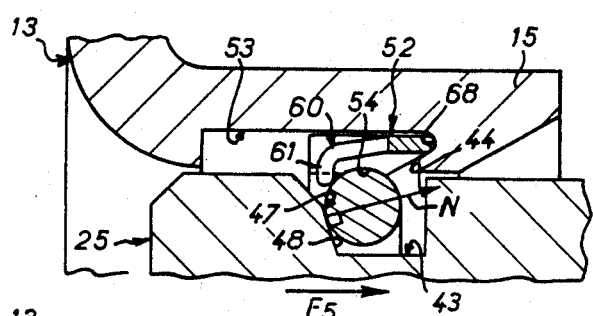
FIG.6C
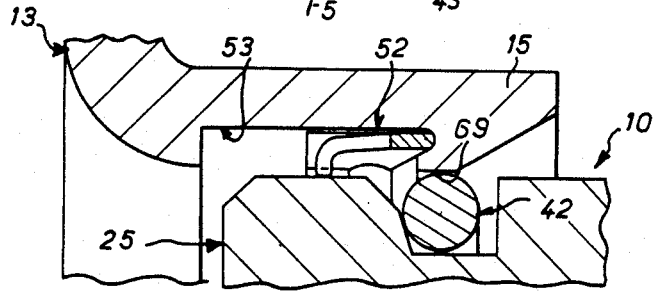
FIG.6D
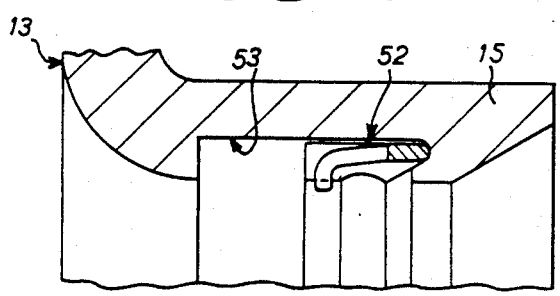
FIG.6E
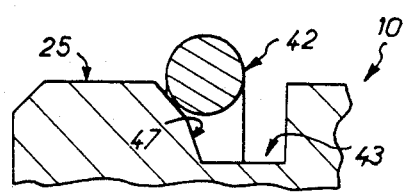

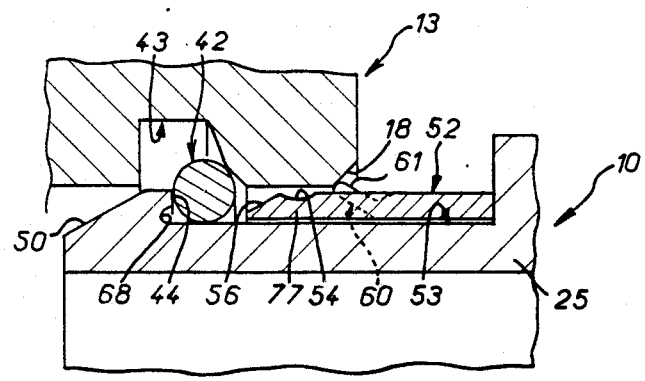
FIG.7
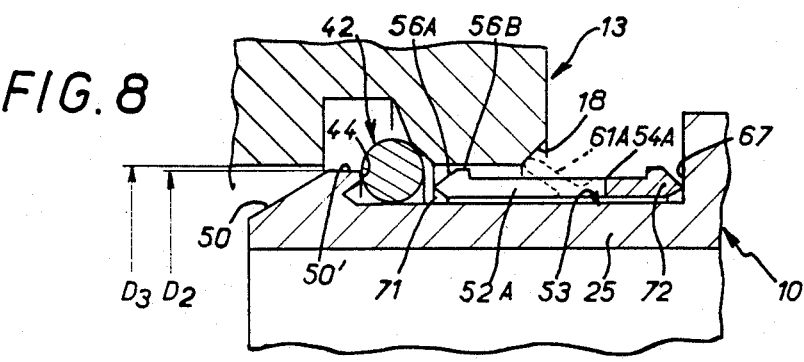
FIG.8
FIG.9 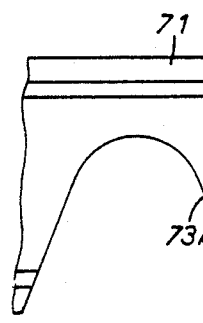 FIG.10 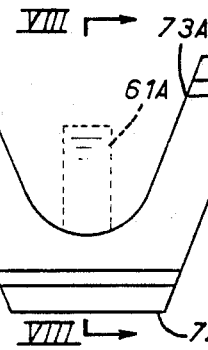
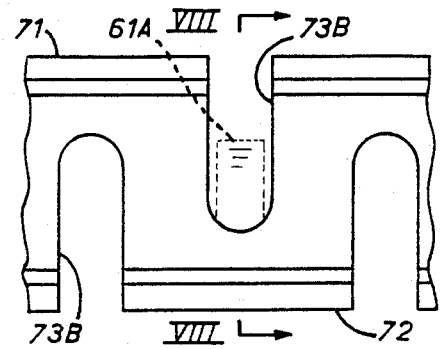
FIG.11
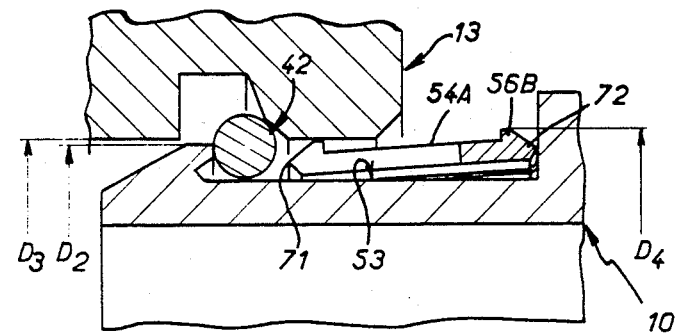

COUPLABLE/DECOUPLABLE CLUTCH RELEASE BEARING ASSEMBLY

BACKGROUND OF THE INVENTION

1. Field of the Invention

The present invention is generally concerned with clutch release bearings, in particular those for automobile vehicles.

It is more particularly directed to so-called "pull" type clutch release bearings which are designed to operate in traction on the clutch release device of the clutch to be operated and which are coupled to this device for this purpose.

2. Description of the Prior Art

In some clutch release bearing assemblies, and in particular in the clutch release bearing assembly described in French Pat. No. 2,304,826 and that described in commonly assigned with this invention copending U.S. patent application Ser. No. 683 390 of Dec. 19, 1984, it has been proposed to use between the clutch release bearing and the clutch release device to be operated, in order to couple the clutch release bearing to the clutch release device, a part preferred to hereinafter for convenience only as the "coupling part" or "action part" which, appropriately attached to the clutch release device, comprises on the side of the latter opposite the clutch release bearing a radial bearing flange through which it is adapted to operate on it, in cooperation with fastening means operative in traction between a coupling part of this kind and a part referred to hereinafter for convenience only as the "drive part" forming part of the clutch release bearing, adapted to provide an axial coupling between said parts in the axial direction from the clutch release device to the clutch release bearing.

In the above-mentioned French patent and U.S. patent application the fastening means operative in traction employed generally comprise an annular coupling member which is elastically deformable in the radial direction, such as a simple ring, for example, and which is at least partially inserted radially into an annular retaining groove formed for it on either of the parts to be fastened together in traction, and a substantially transverse drive bearing surface on the other of these parts with which said coupling member cooperates in axial bearing engagement in the axial direction corresponding to the required axial coupling.

A particular advantage of an arrangement such as this is that it enables the clutch release device of the clutch to be operated to be fitted with the coupling part in advance, even before the corresponding clutch cover assembly is put together, and then, at the final assembly stage, the clutch release bearing to be engaged with the coupling part and thus with the clutch release device, by means of a simple clipping action.

Although the required coupling between the clutch release bearing and the clutch release device of the clutch to be operated is thus very easily procured, this does not apply for the converse process, meaning the process necessary to decouple the clutch release bearing and the clutch release device.

Failing other measures, it is normally necessary to demount the clutch beforehand in order to gain access from the front, that is to say from the clutch release device side, to the coupling member in order to be able to cause it to retract elastically to achieve the necessary decoupling.

To overcome this difficulty it is proposed in the aforementioned U.S. patent application to use a mobile part to delimit the retaining groove; this so-called decoupling part, which is in the form of a bush, is normally spaced axially from the coupling member and it is sufficient to displace it axially towards the coupling member to expel it from the retaining groove and so bring about the necessary decoupling.

Although it has proven satisfactory, an arrangement of this kind does raise problems.

In particular, a tool is needed for maneuvering the decoupling part, which makes this maneuver relatively difficult.

In the European patent application filed Nov. 10, 1983 under the number 83306880.2 and published under the number 0 110 602 there is described an arrangement with which, both for decoupling and coupling, it suffices to procure appropriate axial movement of the clutch release bearing relative to the clutch release device of the clutch to be operated, the axial movement to be applied to the clutch release bearing in this way being very simple to apply blind using a control member, in practice a clutch release yoke, usually associated with it.

Using this arrangement there is associated with the coupling member an annular decoupling member which is fitted in advance to that of the parts to be fastened together in traction which comprises the drive bearing surface, at a distance from this surface, and with which said coupling member may become engaged as a result of sufficient axial movement of the clutch release bearing in the axial direction away from the bearing surface, provided that the coupling member is stressed.

The coupling member having been stressed by the decoupling member in this way, it entrains the decoupling member with it when the clutch release bearing is agains subjected to an axial displacement in the axial direction towards the drive bearing surface but, because of the fact that it is stressed, it then escapes from this drive bearing surface which brings about the necessary decoupling.

However, being entrained by the coupling member, in this same movement the decoupling member itself escapes from the part to which it was initially fitted and recoupling becomes impossible unless the decoupling member is first detached from the coupling member and both these members returned to their initial position, or new members substituted for them, which entails operations that are particularly difficult to carry out.

On vehicle assembly lines it may be advantageous to be able to carry out recoupling after decoupling, however.

After coupling the clutch release bearing to the clutch release device of the clutch to be equipped, other assembly operations are carried out on such assembly lines, for example the fitting of the clutch cable controling the assembly, and during such operations accidental action on the clutch release yoke may inadvertently decouple the clutch release bearing.

In commonly assigned with this invention French patent application No. 85 09883 filed June 28, 1985, published as French Publication No. 85 09883 on Apr. 3, 1987, there is proposed an arrangement permitting reversible coupling and/or decoupling to be carried out in a particularly simple and advantageous manner.

Using this arrangement there is associated with the coupling member, as previously, an annular decoupling member but this decoupling member is mounted to be movable axially in a groove from which it cannot escape.

The groove is formed in that of the parts to be fastened together in traction which comprises the drive bearing surface and the drive bearing surface forms part of one its flanks.

The decoupling member conjointly features a frustoconical bearing surface which diverges radially from the bottom of the groove in which it is disposed in the direction towards the drive bearing surface and the circumference of which axially nearest the drive bearing surface is at least level with the circumference forming the free edge of the latter.

When decoupling is required, it is sufficient, as previously, to operate on the clutch release bearing in such a way that the coupling member becomes engaged with the decoupling member.

However, this engagement of the coupling member with the decoupling member is obtained through the frustoconical bearing surface of the latter so that when the clutch release bearing is again moved axially in the axial direction towards the drive bearing surface, in order to bring about the necessary decoupling, the decoupling member which butts up against the drive bearing surface causes, through its frustoconical bearing surface and while remaining in place within the part to which it is fitted, sufficient retraction of the coupling member for the latter to escape from the decoupling member and the drive bearing surface and thus from the part comprising this drive bearing surface.

The decoupling member having remained in place, recoupling is possible.

The arrangement described in French patent application No. 85 09883 is suited only to the case where the coupling member is of one of the types described in the aforementioned French Pat. No. 2 304 826, that is to say to the case where this coupling member comprises a substantially frustoconical washer which has one of its edges engaged in the associated retaining groove and features along its other edge, substantially aligned with it, lugs through which it is adapted to cooperate in axial bearing engagement with the drive bearing surface and lugs which, disposed at an angle to the aforementioned lugs, are also engaged in the retaining groove, on the side opposite the substantially frustoconical washer from which they originate.

It does not suit the case where the coupling member is a simple ring, that is to say the case where the coupling member is in the form of a torus, for example in the form of a torus of circular transverse cross-section.

An object of the present invention is an arrangement suited to a case of this kind.

SUMMARY OF THE INVENTION

The present invention consists in a clutch release bearing assembly comprising a coupling part which is adapted to couple a clutch release bearing to a clutch release device of a clutch and which is attached to the clutch release device, a drive part forming part of the clutch release bearing, an annular retaining groove on one of the coupling and drive parts, fastening means operative in traction between the coupling part and the drive part and adapted to couple said parts together in the axial direction from the clutch release device to the clutch release bearing, the fastening means comprising an annular coupling member which is elastically deformable in the radial direction and at least partly engaged in the annular retaining groove and a substantially transverse drive bearing surface on the other of the coupling and drive parts on which the coupling member bears axially in the axial direction in question, a groove in the same part as the drive bearing surface, and an annular decoupling member which is adapted to decouple the clutch release bearing from the clutch release device of the clutch, which is movable axially in the groove, of one flank of which the drive bearing surface forms part, and which comprises an annular groove facing the annular retaining groove adapted to couple it selectively to the coupling member at least in the axial direction from the clutch release device to the clutch release bearing.

By virtue of an arrangement such as this, and as previously, decoupling may advantageously result from simple axial blind displacement of the clutch release bearing, first in one direction and then in the opposite direction, and after such decoupling it is advantageously possible to achieve recoupling.

Also, occupying a relatively modest volume, the decoupling member integrated in this way with a clutch release bearing assembly of this kind has the advantage of not significantly increasing the overall axial or radial dimension of either of the parts of the clutch release bearing assembly concerned.

The characteristics and advantages of the invention will emerge from the following description given by way of example only and with reference to the accompanying diagramatic drawings.

BRIEF DESCRIPTION OF THE DRAWINGS

FIG. 1 is a view in axial cross-section of a clutch release bearing assembly employing a decoupling member in accordance with the invention.

FIG. 2 shows to a larger scale the detail marked by a box II in FIG. 1.

FIG. 3 is a partial view in elevation and to a different scale of the coupling member used in this clutch release bearing assembly as seen in the direction of the arrow III in FIG. 2.

FIG. 4 is a partial view of this decoupling member in axial cross-section on the line IV—IV in FIG. 3.

FIGS. 6A through 6E are views which, also analogous to that of FIG. 2, illustrate the decoupling of the clutch release bearing from the coupling part carried by the clutch release device of the clutch.

FIG. 7 is a view, also analogous to that of FIG. 2, relating to an alternative embodiment of the invention.

FIG. 8 is a view similar to FIG. 7 but relating to an embodiment using a non-split decoupling member shown in cross-section on the line VIII—VIII in FIG. 9 or 10.

FIGS. 9 and 10 are partial plan views of two embodiments of this kind.

FIG. 11 is a view similar to that of FIG. 8 relating to another embodiment of a decoupling member of analogous type.

DESCRIPTION OF THE PREFERRED EMBODIMENT

Figure 5A:
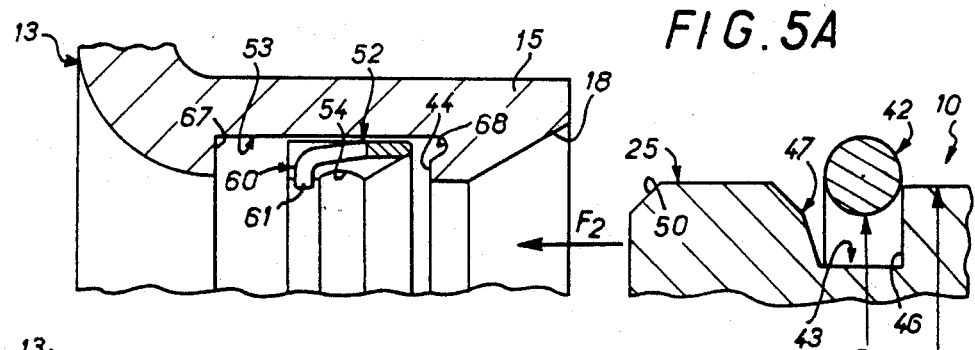
FIGS. 5A through 5E are views which, analogous to that of FIG. 2, illustrate the coupling of the clutch release bearing concerned to the coupling part carried by the clutch release device of the clutch to be operated.
Figure 5B:
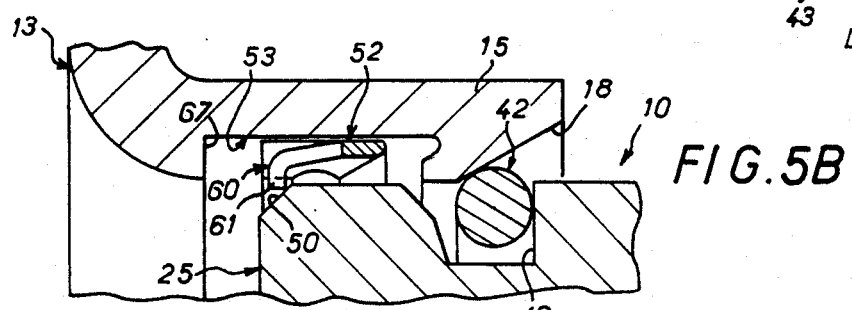

The embodiment shown in FIGS. 1 through 6 will now be described.

As shown by FIG. 1, the object is to couple a clutch release bearing 10 to the clutch release device 11 of any form of clutch to be operated.

The clutch release device 11 is, in a manner which is known per se, formed by the ends of radial fingers of a diaphragm spring, meaning an annular member which, forming part of the clutch to be operated, comprises a circumferentially continuous peripheral part forming a Belleville washer, for urging the clutch towards an engaged condition, and a central part divided by slots into radial fingers, namely the radial fingers just mentioned, to constitute levers adapted to operate the clutch release device to disengage the clutch.

In a manner also known per se, for the purpose of coupling the clutch release bearing 10 to the clutch release device 11, which is necessary for the clutch release device 11 to operate in traction on the clutch release bearing 10, there is attached to the clutch release device, by means of its central opening 12, a part 13 referred to hereinafter for convenience as the coupling part.

This coupling part, or action, is of the type described in U.S. patent application Ser. No. 598,684 commonly assigned with this invention of Apr. 10, 1984.

As a coupling part of this kind does not of itself constitute part of the present invention it will not be described in detail here.

It will suffice to mention that, on the side of the clutch release device 11 opposite the clutch release bearing 10, it comprises a radial flange 14 called the bearing flange for action on a clutch release device 11 of this kind, the bearing flange being appropriately profiled to this end, and that it comprises in one piece with the bearing flange 14, at its inside edge, a bush 15 which extends substantially axially through the clutch release device 11 by means of the central opening 12 therein, and at its outside edge spaced lugs 16 which also pass axially through the clutch release device 11, each passing between two adjacent radial fingers of the latter, and each carrying cantilever fashion a circumferentially projecting retaining finger 17 at their end, in line with the bearing flange 14 and substantially parallel thereto, the retaining finger 17 being adapted to secure, in cooperation with the bearing flange 14, axial retention of the assembly to the clutch release device 11.

As described in the aforementioned U.S. patent application Ser. No. 598,684, a coupling part 13 of this kind is fitted to the clutch release device 11 by means of a bayonet type coupling: when the coupling part 13 and the clutch release device 11 have been brought sufficiently close together, the end of each of the radial fingers of the clutch release device 11 over which has to be circumferentially engaged the retaining finger 17 of the lugs 16 on the coupling part 13 is bent axially relative to the others, and the coupling part 13 is then rotated about the axis of the assembly relative to the clutch release device 11 so that such engagement becomes effective and the previously bent radial fingers of the clutch release device 11 are then released.

The axial bush 15 of the coupling part 13 extends in a generally rectilinear manner overall.

At the inside edge of its free end it is bevelled and so forms, for reasons that will emerge hereinafter, a frusto-conical engagement bearing surface 18.

The clutch release bearing 10 is not in itself part of the present invention, either.

In the manner that is known per se, it comprises a drive member 20 through which it is adapted to operate on the clutch release device 11, through the intermediary of the coupling part 13, as described in detail hereinafter, a maneuvering member 22 through which it is adapted, as schematically represented in chain-dotted line in FIG. 1, to be mounted for axial sliding on any form of guide member 23 and by which, as also schematically represented in chain-dotted line in FIG. 1, it is also adapted to be operated by a control member 24 consisting of a clutch release yoke with fingers or arms 21, and coupling means axially fastening the drive member 20 to the maneuvering member 22.

The drive member 20 consists of a ball bearing.

For cooperation with the coupling part 13 it comprises a part 25 hereinafter referred to for convenience as the drive part.

This drive part 25 consists of the inner race of this ball bearing, sufficiently lengthened in the axial direction towards the clutch release device 11 for this purpose.

The maneuvering member 22 comprises an axial sleeve 26 through which it is adapted to be slid over the guide member 23 and a transverse annular flange 27 at a first end of the sleeve 26, adapted to cooperate with the drive member 20, and two transverse arms 28 at the other end of the sleeve 26, for the control member 24 to act on.

For reasons that will emerge hereinafter, the maneuvering member 22 further comprises arms 29 parallel to and spaced from the arms 28, so that each of the fingers 21 of the control member 24 is flanked on one side by an arm 28 of the maneuvering member 22 and on the other side by an arm 29 thereof.

The coupling means fastening the drive member 20 axially to the maneuvering member 22 comprise a cover 30, engaged by means of openings 31 over pegs 32 projecting radially from the edge of the flange 27 of the maneuvering member 22 and thus fastened axially to the latter, which extends beyond the outer race 33 of the ball bearing constituting the drive member 20 and comprises, at the end of this outer race 33, a right-angle lip 34 extending radially towards the axis of the assembly.

As the clutch release bearing is of the maintained self-centering type, annular clearance is provided between the cover 30 and the ball bearing constituting the drive member 20; between the outer race 33 of the latter and the maneuvering member 22 there are axially acting elastic means consisting of a corrugated washer 35 of the type marketed under the trade name "ONDU-FLEX".

This corrugated washer 35 urges the ball bearing constituting the drive member 20 axially toward the right-angle lip 34 of the cover 30, so that the corresponding edge of its outer race 33 cooperates with the latter.

A friction washer 37 is disposed between the outer race 33 and the right-angle lip 34.

For reasons that will emerge hereinafter, the drive part 25 and the drive member 20 carry an abutment washer 39 projecting radially on its outside periphery in its median area, split radially by a slit and interlocked with it by means of a groove 40 provided for this purpose on its outside periphery.

These arrangements being well known in themselves and not forming part of the present invention will not be described in more detail here.

In a manner which is also known per se fastening means operative in traction are provided between the drive part 25 of the clutch release bearing 10 and the coupling part 13 carried by the clutch release device 11, adapted to provide an axial coupling between these parts in the axial direction from the clutch release device 11 to the clutch release bearing 10 as schematically represented by the arrow F1 in FIG. 1.

The coupling part 13 comprises an axial bush 15 coaxial with the drive part 25 and the fastening means operative in traction are disposed between this bush 15 and the drive part 25.

To be more precise, the drive part 25 is inserted in the bush 15 of the coupling member 13 so that the fastening means operative in traction concerned are operative between the outside periphery of the drive part 25 and the inside periphery of the bush 15.

Generally speaking, they comprise (see FIGS. 1 and 2) an annular coupling member 42 which is elastically deformable in the radial direction and which is at least partially inserted radially into an annular retaining groove 43 formed for it on either of the parts 13, 25 in question and a substantially transverse drive bearing surface 44 on the other of the parts 13, 25 with which it is adapted to cooperate in axial bearing engagement in the axial direction in question, namely that shown by the arrow F1 in FIG. 1.

The retaining groove 43 is formed on the drive part 25, in the vicinity of the free end of the latter, while the drive bearing surface 44 is formed on the bush 15 of the coupling part 13.

Also, the coupling member 42 is formed by a simple ring.

It is therefore a part of generally toroidal shape split radially by a slit.

The ring forming the coupling member 42 has a circular transverse axial cross-section, being made, for example, by rolling a round wire.

In the unstressed state (FIG. 5A) it occupies a deployed configuration in which its inside diameter D1 is less than that D2 of the outside periphery of the drive part on which the corresponding retaining groove 43 is formed.

However, because of the slit that it comprises it can assume a retracted configuration (see FIG. 5C, for example), in which it is more deeply inserted in the radial direction into the retaining groove 43.

The flank 46 of the retaining groove 43 facing in the same axial direction as the drive bearing surface 44 is straight.

In accordance with the invention, however, and for reasons that will emerge hereinafter, the flank 47 of the retaining groove 43 opposite the drive bearing surface 44 features, starting from the bottom of the retaining groove 43, a first frustoconical bearing surface 48 and, following on from this, a second frustoconical bearing surface 49 of smaller cone angle than the first and extending as far as the outside periphery of the drive part 25 concerned.

Thus, on the side of the flank 47 the retaining groove 43 is divergent from its bottom towards the outside periphery of the drive part 25.

At its free end the drive part 25 is bevelled, like the bush 15 of the coupling part 13, and thus it also features a frustoconical bearing surface 50, for reasons that will emerge hereinafter.

In the manner which is known per se there is also provided an annular decoupling member 52.

This decoupling member 52 is mounted to be movable axially in a groove 53 formed for it in that of the parts 13, 25 comprising the drive bearing surface 44, meaning the coupling part 13, and of one flank of which said drive bearing surface 44 forms part.

This groove 53 opens onto the inside periphery of the bush 15 of the coupling part 13, which has an outside diameter D3 slightly greater than that D2 of the outside periphery of the drive part 25.

In accordance with the invention the coupling member 42 is formed, as indicated above, by a simple ring and the decoupling member 52 comprises an annular groove 54 facing towards the retaining groove 43 and thus on its inside periphery; the groove 54 is adapted to provide for its releasable coupling to said coupling member 42, at least for the axial direction from the clutch release device 11 to the clutch release bearing 10.

This groove 54 in the decoupling member 52 has an axial profile which is at least in part complementary to that of the coupling member 42, meaning that it is a part-circular profile.

The decoupling member 52 is in the form of a relatively flat ring and its groove 54 is disposed substantially in the median area of its inside periphery.

On the side of this groove 54 axially opposite the drive bearing surface 44 the inside periphery of the decoupling member 52 forms a cylindrical bearing surface 55.

On the opposite side, however, meaning on the same side as the drive bearing surface 44, the decoupling member 52 comprises on its inside periphery, merging with its groove 54, a frustoconical engagement bearing surface 56 the concave side of which faces towards the drive bearing surface 44 and which merges with the groove 54 at an edge 57.

As for the outside periphery of the decoupling member 52, it forms a substantially cylindrical bearing surface 58.

Thus although on the side axially opposite the drive bearing surface 44 the decoupling member 52 has a straight transverse profile, on the side of the drive bearing surface 44 it has a substantially triangular profile.

The decoupling member 52 comprises a plurality of axial tangs 60 referred to hereinafter for convenience as drive tangs which are elastically deformable in the radial direction and the free ends 61 of which, when they are unstressed, project radially from that of its peripheries which, facing towards the retaining groove 43, features a groove 54; as specified hereinabove, this is therefore its inside periphery.

As shown, the free end of a drive tang 60 of this kind is preferably axially spaced from the groove 54, extending from the side of this opposite the drive bearing surface 44.

It is therefore from the cylindrical bearing surface 55 formed by the inside periphery of the decoupling member 52 that the free ends 61 project radially in the unstressed condition.

However, in the axial direction each drive tang 60 is entirely contained within the overall contour of the decoupling member 52, its free end 61 being situated short of the straight flank which the latter forms on the side axially opposite the drive bearing surface 44.

Each drive tang 60 is in one piece with the decoupling member 52, grooves 62 delimiting it laterally from the main part of the decoupling member 52, while it is axially rooted in the edge portion of the latter comprising the frustoconical bearing surface 56 on its inside periphery.

It is to be understood that the decoupling member 52 comprises a plurality of identical drive tangs 60 appropriately distributed in the circumferential direction.

Only one of them is visible in the figures, however.

In order to fit it into the groove 53 the decoupling member 52 is also elastically deformable in the radial direction and to this end it is also split radially by a slit (FIG. 1).

By virtue of this slit, visible in FIG. 1, it can assume a retracted configuration enabling it to be engaged in the bush 15 of the coupling member 13; when it reaches the groove 53 in the latter, it resumes a deployed configuration, which is its unstressed configuration, by virtue of its inherent elasticity.

For this deployed configuration the cylindrical bearing surface 55 on its inside periphery has a diameter substantially equal to that D3 of the inside periphery of the bush 15 of the coupling part 13 and therefore slightly greater than that D2 of the outside periphery of the drive part 25.

It will be easily understood that a decoupling member 52 of this kind may be molded from a synthetic material, for example.

This is why the edge portion of the decoupling member 52 in which the drive tangs 60 are rooted is locally of reduced thickness in line with each of these (at 64) in order to allow the punches needed to form the free end 61 of the drive tangs 60 to pass.

The corresponding thinner area 64 of the decoupling member 52 is flush with its outside periphery so that the main part 65 of the drive tangs 60 is also substantially tangential to this outside periphery from this thinner area 64, then curving through a substantial right-angle towards the corresponding free end 61.

On the side axially opposite the drive bearing surface 44 the groove 53 in which the decoupling member 52 is mounted to move axially has a straight flank 67 reflecting the corresponding flank of the decoupling member 52.

However, at the root of its flank of which the drive bearing surface 44 forms part the groove 53 features a recess 68 the profile of which is adapted to allow the decoupling member 52 to enter it at least in part.

This profile is therefore substantially triangular, reflecting the corresponding profile of the decoupling member 52.

The recess 68 that the groove 53 thus features in the manner of a simple pit merges with the drive bearing surface 44 and the part concerned, namely the coupling part 13 and to be more precise its bush 15, comprises a cylindrical bearing surface 69 on its inside periphery that joins up with the free edge of the surface 44, leaving a sufficient thickness of material between it and the recess 68.

The drive bearing surface 44 is substantially straight and transversely disposed relative to the axis of the assembly, like the opposite flank 67.

The coupling part 13 is fitted in advance with a decoupling member 52 of this kind, disposed in its groove 53, and the decoupling member 52 can occupy any axial position in this groove (FIG. 5A).

Likewise, the drive part 25 of the drive member 20 of the clutch release bearing 10 is fitted in advance with the coupling member 42.

To couple up the assembly the drive part 25 of the clutch release bearing 10 is inserted axially into the axial bush 15 of the coupling part 13, as represented schematically by the arrow F2 in FIG. 5A.

Because of the frustoconical engagement bearing surface 18 on the axial bush 15, the ring constituting the coupling member 42 is obliged to retract (FIG. 5B) and thus is inserted more deeply into the retaining groove 43 in the drive part 25.

Figure 5C:
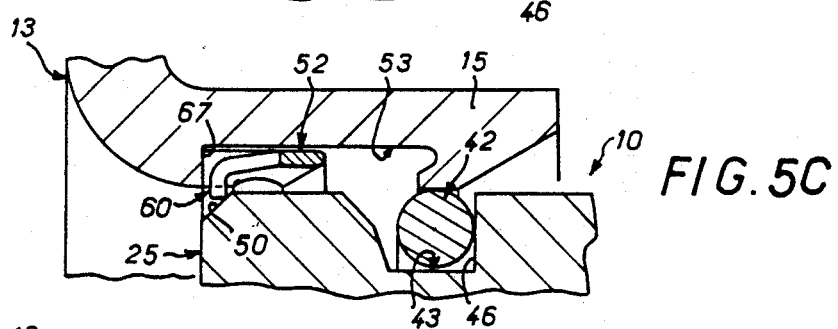

At some time during its insertion into the bush 15 of the coupling member 13, the drive part 25 bears through its frustoconical bearing surface 50 against the free ends 61 of the drive tangs 60 of the decoupling member 52 and, as the axial insertion of the clutch release bearing 10 continues, it entrains the latter with it until, the decoupling member 52 butting up against the straight flank 67 of the groove 53 in which it is engaged, it is halted (FIG. 5C).

As axial insertion of the clutch release bearing 10 continues, the frustoconical bearing surface 50 of its drive part 25 constrains the drive tangs 60 to bend radially away from the axis of the assembly, enabling it to become engaged under the free end 61 of the latter and so continue to move.

However, during this axial insertion of the clutch release bearing 10 the coupling member 42, pushed as it is by the straight flank 46 of the retaining groove 43 on the drive part 25 of the latter in which it is radially inserted, has also been forced under the cylindrical bearing surface 69 of the bush 15 of the coupling part 13 (FIG. 5C) until it enters the groove 53 in the latter.

Released at this stage, the coupling member 42 tends to resume its deployed configuration in the groove 53 and, as shown, it may therefore bear against the bottom of the groove 53.

Alternatively, it may equally well remain at a distance from the bottom of the groove.

It is to be understood that the coupling member 42 is deployed immediately after it moves beyond the drive bearing surface 44.

Figure 5D:
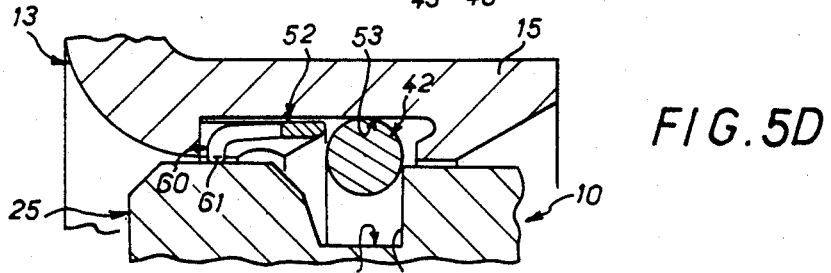

As schematically represented by the clearance shown in FIG. 5D between the coupling member 42 and the drive bearing surface 44, axial insertion of the clutch release bearing 10 is deliberately extended by an overtravel so as to be sure that the coupling member 42 has actually passed axially beyond the drive bearing surface 44.

Figure 5E:
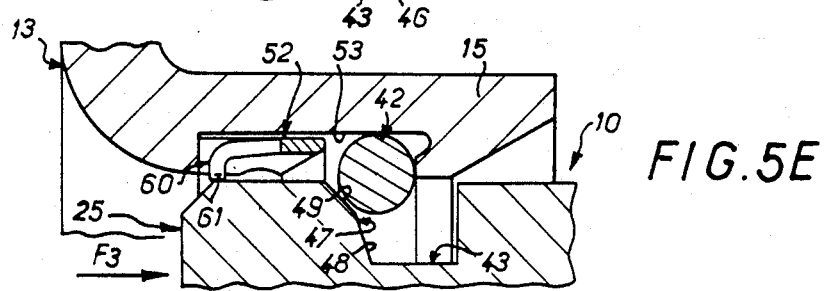

To achieve the required coupling it is then sufficient to reverse the axial movement of the clutch release bearing 10, as shown by the arrow F3 in FIG. 5E.

The drive part 25 then bears against the coupling member 42 through the frustoconical bearing surface 49 of the flank 47 of its retaining groove 43 and, pushing the coupling member 42 back towards the drive bearing surface 44, it presses it axially against the latter.

The required coupling is thus achieved: if a traction force is applied to the clutch release bearing 10 by the control member 24 in the direction of the arrow F1 in FIG. 1, which corresponds to the arrow F3 in FIG. 5E, this traction force is transmitted to the clutch release device 11 through the coupling member 42 and the coupling part 13 in succession.

When the coupling member 42 is engaged in this way with the drive bearing surface 44 on the coupling part 13, it is through the frustoconical bearing surface 49 of the flank 47 of its retaining groove 43, the one with the smaller cone angle, that the coupling member 42 bears against the drive part 25.

The axial movement that has to be applied to the clutch release bearing 10, first in one direction and then in the other, to procure such coupling, may advantageously be communicated to it blind using the control member 24, the fingers 21 of the latter acting first on the arms 29 of the maneuvering member 22 of the clutch release bearing 10 and then on its arms 28.

The same applies to decoupling.

Initially, the clutch release bearing 10 is again inserted axially into the bush 15 of the coupling part 13, in the direction of the arrow F4 in FIG. 6A, so that through the flank 46 of its retaining groove 43 its drive part 25 moves the coupling member 42 towards the decoupling member 52.

This movement continuing, the coupling member 42 comes into contact with the decoupling member 52 through the latter's frustoconical bearing surface 56 and as the decoupling member 52 is butted up axially against the straight flank 67 of the groove 53 in which it is disposed, and therefore fixed, the coupling member 42 is constrained to retract by the decoupling member 52.

Guided by the frustoconical bearing surface 56 of the decoupling member 52, it eventually enters the annular groove 54 in the latter, after passing over the edge 57 separating the annular groove 54 from the frustoconical bearing surface 56 (FIG. 6B).

The coupling member 42 is then releasably coupled to the decoupling member 52 and the clutch release bearing 10 is moved in the opposite axial direction, that of the arrow F5 in FIG. 6C.

Through the flank 47 of its retaining groove 43 the drive part 25 bears on the coupling member 52 and, as the axial movement of the clutch release bearing 10 continues, it entrains with it the assembly formed by the coupling member 42 and the decoupling member 52 interlocked with it until, as shown in FIG. 6C, the decoupling member 52, partially engaged in the recess 68 in the groove 53, comes into abutting relationship against the corresponding end of the latter.

When the coupling member 42 is interlocked in this way with the decoupling member 52 it is through the frustoconical bearing surface 48 of the flank 47 of its retaining groove 43 that the drive part 25 bears on the coupling member 42.

By design, the cone angle of the frustoconical bearing surface 48 is such that when, as shown, the decoupling member 52 is butted up against the flank of the groove 43 of which the drive bearing surface 44 forms part, the normal N to this frustoconical bearing surface 48 along the line of contact between it and the coupling member 42 lies at a distance from the groove 54 in the decoupling member 52.

This normal N is also spaced from the groove 53.

If the axial movement of the clutch release bearing 10 is continued (FIG. 6D) the result is that the force exerted on the coupling member 42 by the drive part 25 causes the coupling member 42 to escape from the groove 54 in the decoupling member 52.

It is then obliged to come into contact with the cylindrical bearing surface 69 on the bush 15 of the coupling part 13 (FIG. 6D).

Bringing the coupling member 42 into contact with the cylindrical bearing surface 69 is facilitated by the fact that, by virtue of the insertion of the decoupling member 52 into the recess 68 provided in the groove 53 at the base of the drive bearing surface 44, the gap separating the groove 54 of the decoupling member 52 axially from this cylindrical bearing surface 69 of the coupling part 13 is advantageously reduced and by the fact that the aforementioned normal N is also spaced from the groove 53.

As axial movement of the clutch release bearing 10 is continued, the coupling member 42 then escapes from the coupling part 13 (FIG. 6E).

The required decoupling is thus achieved.

However, recoupling is possible by means of the process previously described.

Thus it is possible in accordance with the invention to achieve such coupling and such decoupling in a reversible manner.

Each time the coupling member is releasably coupled to the decoupling member according to the process described, followed by their decoupling, and this coupling is equally adapted to driving of the assembly in the axial direction from the clutch release device of the clutch concerned to the clutch release bearing as in the opposite axial direction, even if it is operative only in the first of these directions.

FIG. 7 shows an alternative embodiment in which, instead of being carried by the drive part 25 of the clutch release bearing 10, the coupling member 42 is carried by the coupling part 13, the retaining groove 43 being formed in the latter for this purpose.

The corresponding drive bearing surface 44 is provided by the drive part 25 of the clutch release bearing 10 and the decoupling member 52 is carried by the latter, the groove 53 in which the decoupling member 52 is axially movable being formed on the outside periphery of the drive part 25.

The other arrangements are of the same kind as previously: in particular, there are frustoconical bearing surfaces 48, 49 on the flank 47 of the retaining groove opposite the drive bearing surface 44, a recess 68 at the base of the latter and, on the decoupling member 52, a groove 54, a frustoconical engagement bearing surface 56 and drive tangs 60.

As distinguished from the previous arrangements, however, the drive tangs 60, whose free ends 61 project when unstressed from the outside periphery of the decoupling member 52, extend axially towards the drive bearing surface 44 and alternate with axial lugs 77 which form the corresponding main part of the decoupling member 52 and on which are formed the groove 54 and the frustoconical engagement bearing surface 56.

Overall, operation is also the same as described hereinabove; on coupling, the free ends 61 of the drive tangs 60 of the decoupling member 52 initially butt up against the frustoconical engagement bearing surface 18 of the coupling part 13 before retracting elastically into the latter while through its frustoconical engagement bearing surface 50 the drive part 25 of the clutch release bearing 10 constrains the coupling member 42 to expand over the drive bearing surface 44 and so reach the groove 53; on decoupling, the coupling member 42 is temporarily and releasably housed in the transverse groove 54 that the decoupling member 52 features for this purpose.

In the decoupling members 52 that have just been described the elasticity required in the radial direction for them to be fitted in the groove 53 was achieved by means of a radial slit. FIGS. 8 through 11 show some embodiments in which the radial slit is no longer necessary.

FIGS. 8 and 9 show an embodiment using a decoupling member featuring a flat-bottomed groove with straight sides formed by transverse edges 71, 72 having a generally triangular cross-section with a frustoconical engagement bearing surface 56A merging with the groove 54A by a cylindrical bearing surface 56B. As seen in FIG. 9 the two edges 71, 72 each have notches 73A alternating between them and interleaved with each other in the axial direction.

These notches confer on the annular structure of the decoupling member an ability to deform elastically in the radial direction so that it can be fitted onto the associated part, in this instance the drive part 25, passing in succession over the engagement ramp surface 50 and the cylindrical bearing surface 50′ by its two axial halves.

In this respect the result is precisely the same in the case of an embodiment of the kind shown in FIG. 10 which differs from that of FIG. 9 in terms of the shape of the notches 73B, which are slots with parallel edges whereas the notches in FIG. 9 are somewhat rounded and somewhat divergent.

The structure as shown in cross-section in FIG. 8 remains applicable in both cases and the functioning is broadly similar to that described above with reference to FIG. 7. The overall outside dimensions of the decoupling member being assumed to be the same, it remains possible to provide a few drive tangs 61A: as shown in dashed line these may be formed from the bottom of a few notches 73A facing towards the edge 71 and for reasons of symmetry the same number of tangs may be provided from complementary notches towards the edge 72.

These drive tangs are in no way indispensable, however, mere friction against the coupling part 13 possibly being sufficient to procure entrainment of the decoupling member in the groove 53 on the drive part 25 in the axial direction towards the flank 67 opposite the drive bearing surface 44.

The drive tangs shown at 61A are of no utility in the case of the embodiment shown in FIG. 11: this differs from the previous embodiment in that the diameter D4 of the cylinder tangential to the apexes 56B of the edges 71, 72 is made slightly larger than the inside diameter D3 of the coupling part 13. Given these conditions all of the edge 71 engaged in the coupling part forms positive entrainment means through all of its elements, forming to some degree a complete circle of tangs defined by the notches 73A and all deflecting elastically in the radially inwards direction, the clearance provided between the inside wall of the decoupling member and the bottom of the groove 53 then being appropriately augmented.

The same type decoupling member may also be used in the case of the embodiment of the kind shown in FIGS. 1 through 6: the projections 56B naturally face radially inwards in this case in order to cooperate with the outside edge of the drive part 10 which then carries the coupling member 42.

There is claimed:

1. Clutch release bearing assembly comprising a clutch release bearing including a drive part, and a coupling part adapted to be attached to a clutch release device of a clutch and to couple such a clutch release device to said clutch release bearing, an annular retaining groove on one of said coupling and drive parts, fastening means operative in traction and between said coupling part and said drive part for coupling said coupling and drive parts together in an axial direction away from the clutch release device and towards said clutch release bearing, said fastening means comprising a radially elastically deformable annular coupling member partly engaged in said annular retaining groove, and a substantially transverse drive bearing surface on the other of said coupling and drive parts, said coupling member being adapted to bear axially against said drive bearing surface, another groove in said other part, and an annular decoupling member adapted to decouple said clutch release bearing from the clutch release device, said decoupling member being axially movable in said other groove, said other groove having one transverse flank on which is defined said drive bearing surface, said decoupling member having an annular decoupling groove releasably couplable with said coupling member in the course of decoupling said coupling and drive parts to permit movement of said decoupling member with said coupling member in said axial direction.

2. Clutch release bearing assembly according to claim 1, wherein said decoupling groove has an axial section at least partly complementary to that of said coupling member.

3. Clutch release bearing assembly according to claim 1, wherein said decoupling member has a frustoconical engagement bearing surface adjoining said decoupling groove and facing said drive bearing surface.

4. Clutch release bearing assembly according to claim 1, wherein said one flank on which said drive bearing surface is formed has a root portion including a recess adapted to receive at least part of said decoupling member.

5. Clutch release bearing assembly according to claim 4, wherein said recess is substantially triangular in axial section and said other part has a cylindrical bearing surface adjoining said drive bearing surface remote from said recess.

6. Clutch release bearing assembly according to claim 1, wherein said decoupling member comprises a main part and at least one radially elastically deformable drive tang having a free end protruding radially in the direction of said one part beyond the main part of said decoupling member when the drive tang is unloaded.

7. Clutch release bearing assembly according to claim 6, wherein said free end of said drive tang is axially spaced from said decoupling groove.

8. Clutch release bearing assembly according to claim 7, wherein said free end of said drive tang protrudes from a side of said decoupling groove axially remote from said drive bearing surface.

9. Clutch release bearing assembly according to claim 6, wherein said drive tang is in one piece with the main part of said decoupling member, axial slots in said decoupling member laterally separating said drive tang from the main part of said decoupling member.

10. Clutch release bearing assembly according to claim 6, wherein said drive tang extends within the axial limits of the main part of said decoupling member.

11. Clutch release bearing assembly according to claim 6, wherein said decoupling member comprises a plurality of said drive tangs circumferentially spaced from one another.

12. Clutch release bearing assembly according to claim 6, wherein said drive tang is engageable with said drive part proximate to a free end thereof facing the clutch release device for moving said decoupling member in a direction opposite said axial direction in the course of coupling said parts together.

13. Clutch release bearing assembly according to claim 6, wherein said retaining groove is provided in said coupling part and said other groove is provided in said drive part.

14. Clutch release bearing assembly according to claim 1, wherein said retaining groove has a flank axially remote from said one flank on said other part, said retaining groove flank having a frustoconical bearing surface, said coupling member bearing on said frustoconical bearing surface when said coupling member is in engagement with said decoupling member, said frustoconical bearing surface having a cone angle such that a normal to said frustoconical bearing surface at a zone of contact of said coupling member when said decoupling member abuts said one flank is spaced from said decoupling groove.

15. Clutch release bearing assembly according to claim 14, wherein said normal is also spaced from said other groove.

16. Clutch release bearing assembly according to claim 14, wherein said retaining groove includes another frustoconical bearing surface having a smaller cone angle than that of the first mentioned frustoconical bearing surface, said coupling member being adapted to bear on said other frustoconical bearing surface when said coupling member is in engagement with said drive bearing surface.

17. Clutch release bearing assembly according to claim 1, wherein said drive member has a bevel at a free end thereof facing axially in the direction of the clutch release device.

18. Clutch release bearing assembly according to claim 1, wherein said decoupling member comprises an annular member having notches opening on the respective axial edges of said decoupling member, circumferential consecutive ones of said notches opening on alternate ones of said edges.

19. Clutch release bearing assembly according to claim 18, wherein said decoupling groove is of generally rectangular axial section.

20. Clutch release bearing assembly according to claim 19, wherein said decoupling member is symmetrical in axial section relative to a radial plane through the middle of said decoupling member, two projections at the respective axial ends of said decoupling ends of said decoupling member projecting radially towards said one part.

21. Clutch release bearing assembly according to claim 1, wherein said decoupling member when coupled to said coupling member is axially movable in said other groove in said axial direction.

22. Clutch release bearing assembly according to claim 1, wherein said retaining groove is provided in said drive part and said other groove is provided in said coupling part.

23. Clutch release bearing assembly according to claim 1, wherein said retaining groove is provided in said coupling part and said other groove is provided in said drive part.

24. Clutch release bearing assembly according to claim 1, wherien said drive part is first displaceable relative to said coupling part in a direction opposite said axial direction and then displaceable in said axial direction, for coupling said coupling and drive parts.

25. Clutch release bearing assembly according to claim 24, wherein said drive part is first displaceable relative to said coupling part in a direction opposite said axial direction and then displaceable in said axial direction, for decoupling said coupling and drive parts.

26. Clutch release bearing assembly according to claim 1, wherein said drive part is first displaceable relative to said coupling part in a direction opposite said axial direction and then displaceable in said axial direction, for decoupling said coupling and drive parts.

27. Clutch release bearing assembly according to claim 1, wherein said decoupling member is accommodated in said other groove when the drive and coupling parts are coupled or decoupled.

* * * * *